United States Patent [19]

Ivy et al.

[11] 4,128,642
[45] Dec. 5, 1978

[54] METHOD OF PROMOTING GROWTH AND IMPROVING FEED EFFICIENCY OF ANIMALS

[75] Inventors: Richard E. Ivy; Robert D. Williams, both of Terre Haute, Ind.

[73] Assignee: International Minerals & Chemical Corp., Terre Haute, Ind.

[21] Appl. No.: 752,596

[22] Filed: Dec. 20, 1976

[51] Int. Cl.² ............................................. A61K 31/505
[52] U.S. Cl. ................................................... 424/251
[58] Field of Search ......................................... 424/251

[56] References Cited

U.S. PATENT DOCUMENTS

| 3,371,090 | 2/1968 | Johnston | 424/251 |
| 4,076,815 | 2/1978 | Garzia et al. | 424/251 |

FOREIGN PATENT DOCUMENTS 1223720  3/1971  United Kingdom ................... 424/251

Primary Examiner—Frederick E. Waddell
Attorney, Agent, or Firm—Robert H. Dewey; Howard E. Post

[57] ABSTRACT

A method of promoting the growth and improving the feed efficiency of animals using substituted quinoxalines represented by the formula:

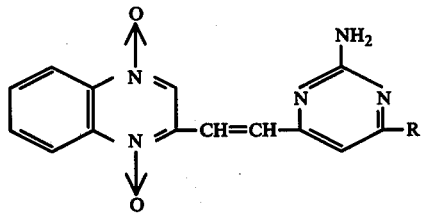

where R is hydrogen or lower alkyl of 1 to about 4 carbon atoms.

11 Claims, No Drawings

METHOD OF PROMOTING GROWTH AND IMPROVING FEED EFFICIENCY OF ANIMALS

BACKGROUND OF THE INVENTION

This invention relates to a method of increasing the growth rate and improving the feed efficiency of animals. In a particular aspect, this invention relates to a method of increasing the growth rate and feed efficiency of immature animals by administration of a member of a class of substituted quinoxalines.

In the business of raising animals for food, it is essential to feed the animals those rations and adjuncts thereto, such as growth stimulants, that provide a rapid weight gain and a high conversion of feed to animal weight. A growth stimulant is a compound which elicits a response of an animal toward its optimum genetic potential from a depression in growth rate and feed efficiency caused by intestinal bacterial flora, stress and subclinical diseases. Antibiotics such as penicillin, bacitracin and tetracyclines have been widely used for this purpose. Antibiotics have several disadvantages, however. There is the possibility that resistant strains of pathogenic organisms may develop. Also these antibiotics are expensive to produce. Accordingly there is a need for other agents to stimulate the growth of animals.

SUMMARY OF THE INVENTION

It is an object of this invention to provide a method of increasing the growth rate and improving the feed efficiency of animals.

It is another object of this invention to provide a method of increasing the growth rate and improving feed efficiency of animals by administration of a substituted quinoxaline.

Other objects will be apparent to those skilled in the art from the disclosure herein.

It is the discovery of this invention to provide a method of increasing the growth rate and improving the feed efficiency of animals by administering to the animals a substituted quinoxaline dioxide represented by the formula:

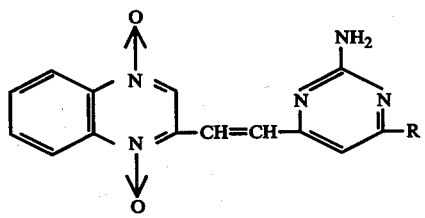

where R is hydrogen or alkyl of 1 to about 4 carbon atoms. The compound acts as a growth stimulant and improves feed efficiency.

A. Garzia in copending U.S. Ser. No. 771,118, now allowed, disclosed the use of substituted quinoxaline dioxides represented by the above formula where R was hydrogen or methyl to treat and prevent cholera in humans. A. Garzia and R. D. Williams disclosed in copending U.S. Ser. No. 772,863, now allowed the use of the same compounds to treat and prevent swine dysentery.

DETAILED DISCLOSURE

According to the method of the present invention, the substituted quinoxaline dioxide represented by the above formula is incorporated in the feed rations at a level of from about 10 g/ton to about 150 g/ton. The preferred level, however, is about 50 g/ton.

It is contemplated that the method of this invention will be particularly suitable for animals raised for food such as fowl, ruminants, swine and rabbits. Although all members of the fowl family - i.e. chickens, turkeys, geese, ducks, guinea, pheasant and quail - will show increased rate of growth and improved feed efficiency, the method is particularly valuable for chicken broilers and turkeys. Of the ruminants, e.g. cattle, sheep and goats, the method is particularly of value for cattle, e.g. steers.

The compounds useful in the practice of the present invention include but are not limited to CO-1 2-[2-(2-amino-6-pyrimidinyl)ethenyl]-quinoxaline-1,4-dioxide CO-2 2-[2-(2-amino-4-methyl-6-pyrimidinyl)ethenyl]-quinoxaline-1,4-dioxide CO-3 2-[2-(2-amino-4-ethyl-6-pyrimidinyl)ethenyl]-quinoxaline-1,4-dioxide CO-4 2-[2-(2-amino-4-n-propyl-6-pyrimidinyl)ethenyl]-quinoxaline-1,4-dioxide CO-5 2-[2-(2-amino-4-isopropyl-6-pyrimidinyl)ethenyl]-quinoxaline-1,4-dioxide CO-6 2-[2-(2-amino-4-n-butyl-6-pyrimidinyl)ethenyl]-quinoxaline-1,4-dioxide CO-7 2-[2-(2-amino-4-isobutyl-6-pyrimidinyl)ethenyl]-quinoxaline-1,4-dioxide CO-8 2-[2-(2-amino-4-[1-methylpropyl]-6-pyrimidinyl)-ethenyl]-quinoxaline-1,4-dioxide.

The preferred compound is CO-1.

These compounds are prepared by reacting in an approximately 1:1 mole ratio quinoxaline-di-N-oxide-2-carboxyaldehyde dimethylacetal and a compound represented by the formula:

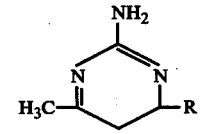

where R has the same meaning as defined above.

The reaction is conducted in the presence of a strong acid catalyst and a suitable solvent, e.g. formic acid or acetic acid. The reaction takes place at ambient to elevated temperatures, e.g. at from about 25° to 50° or more. When the reaction is complete, e.g. after 10–24 hours, the product is recovered by crystallizing it from water.

Catalysts suitable for the practice of this invention are generally known as strong acids and any strong acid known in the art can be used. Suitable strong acids include but are not limited to hydrochloric, hydrobromic, sulfuric, nitric, aryl sulfonic acids, e.g. toluene sulfonic acid, trichloroacetic acid, etc. The acids are generally used in a ratio of about 0.5–2 moles of acid per mole of quinoxaline starting compound.

The quinoxaline-di-N-oxide-2-carboxyaldehyde dimethylacetal used as a starting material for preparing the compounds of the present invention is known in the art. It can be prepared according to the procedure of Haddadin et al., British Pat. No. 1,305,138, Example 13, which is incorporated herein by reference thereto.

The pyrimidine compounds used as starting materials are similarly known in the art. They are either commercially available or can be readily prepared by known methods. The usual commercial grade is suitable for the practice of this invention. Preferably the starting compound should be of good quality, free from deleterious material.

The compounds of the present invention are of a low order of toxicity and are suitable for use by oral administration to increase the growth rate of animals. Toxicity studies of CO-1 were reported by A. Garzia in copending application Ser. No. 771,118, now allowed, which is incorporated herein by reference thereto.

The term "feed rations" is intended to mean the food provided for the animals, and it is not intended that the invention be limited thereby. Preferably the compound is thoroughly mixed with the feed ration so that it is uniformly dispersed throughout. However it is also contemplated that it could be sprinkled on the daily food supplies in the form of a powder or as pellets. Thus it is not intended that the invention be limited to any particular mode of administration.

The invention will be better understood with reference to the following examples. It is understood however that the examples are intended for illustration only and it is not intended that the invention be limited thereby.

EXAMPLE 1

To a reaction vessel there were added 15 ml of 99% formic acid, 1.15 g of 96% sulfuric acid, 1.09 g (0.01 mole) of 2-amino-4-methyl pyrimidine, and 2.36 g (0.01 mole) of quinoxaline-di-N-oxide-2-carboxyaldehyde dimethylacetal. The mixture was heated to 45°–50° and maintained at that temperature for 10 hours. It was then cooled, diluted with 35 ml of cold water and the pH was adjusted to about 5 with sodium bicarbonate. A yellow, crystalline precipitate was formed. It was filtered and washed with water. There was obtained in 64% yield 1.8 g of 2-[2-(2-amino-6-pyrimidinyl)ethenyl] quinoxaline 1,4-dioxide, m.p. 237°–239° with decomposition.

The product was designated CO-1 for convenience.

The effect of CO-1 in feed rations was tested in broiler-cross chicks at a dosage level of 100 g/ton of feed. The broiler feed ration was a 22% chick starter ration. The formula of the ration is given in Table 1. Five replicate groups of 10 chicks (5 males and 5 females), age one day, were fed the ration containing CO-1 and compared to 5 replicates of 10 chicks (5 males and 5 females) which received the same ration but without CO-1. The test period was 28 days. The results obtained are given in Table 2.

Table 1

| CHICK STARTER | | | |
|---|---|---|---|
| % Protein | 22.44% | % Calcium | .97 |
| *M.E. kg calories/lb | 1365.0 | % Phosphorus | .76 |
| Ground yellow corn | | 1039 lb | |
| Soybean meal 44% | | 730 | |
| Meat and bone 50% | | 50 | |
| Dehydrated alfalfa meal 17% | | 50 | |
| Animal fat | | 60 | |
| Calcium carbonate (Limestone) | | 12 | |
| Dicalcium phosphate 24% Ca 18.5% P | | 29 | |
| Salt | | 10 | |
| Vitamin and mineral premix | | 20 | |
| Total | | 2000 lbs | |

*Metabolizeable energy

Table 2
MEAN BODY WEIGHT GAIN AND FEED PER GAIN RATIO

| | Body Weight Gain/Bird | |
|---|---|---|
| | Basal Ration Without CO-1 | Basal Ration With CO-1 |
| Males | 625 g | 648 g |
| Females | 574 | 588 |
| Combined Average | 600 | 619 |
| Improvement, % | — | 3.1 |
| Feed/gain ratio | 1.82 | 1.77 |
| Improvement, % | — | 2.8 |

EXAMPLE 2

The experiment of Example 1 was repeated in all essential details except that 10 replicates were used instead of 5. The results obtained are given in Table 3.

Table 3

| | Body Weight Gain/Bird | |
|---|---|---|
| | Basal Ration Without CO-1 | Basal Ration With CO-1 |
| Males | 662 g | 735 g |
| Females | 584 | 614 |
| Combined Average | 623 | 675 |
| Improvement, % | — | 8.3 |
| Feed/gain ratio | 1.87 | 1.76 |
| Improvement, % | — | 5.9 |

EXAMPLE 3

The experiment of Example 2 was repeated in all essential details. The results obtained are given in Table 4.

Table 4

| | Body Weight Gain/Bird | |
|---|---|---|
| | Basal Ration Without CO-1 | Basal Ration With CO-1 |
| Males | 668 g | 701 g |
| Females | 586 | 611 |
| Combined Average | 630 | 656 |
| Imrpovement, % | — | 4.6 |
| Feed/gain ratio | 1.83 | 1.72 |
| Improvement, % | — | 6.0 |

EXAMPLE 4

The effect of various levels of CO-1 in feed ration was tested in broiler-cross chicks at dosage levels of 25, 50 and 100 g/ton. The broiler feed ration was the same as in Example 1. Five replicate groups of 10 chicks (5 males and 5 females), age one day, were fed the rations containing CO-1 and compared to 5 replicates of 10 chicks (5 males and 5 females) receiving the same ration but without CO-1. The test period was 28 days. The results obtained are given in Table 5.

Table 5

| | Body Weight Gain/Bird | | | |
|---|---|---|---|---|
| | Basal Ration Without CO-1 | Basal Rations with CO-1 Grams/Ton | | |
| | | 25 | 50 | 100 |
| Males | 625 g | 662 g | 655 g | 642 g |
| Females | 567 | 572 | 588 | 581 |
| Combined Average | 596 | 617 | 622 | 613 |
| Improvement, % | — | 3.5 | 4.4 | 2.9 |
| Feed/gain ratio | 1.88 | 1.86 | 1.85 | 1.88 |
| Improvement, % | — | 1.1 | 1.6 | 0.0 |

EXAMPLE 5

The experiment of Example 4 was repeated in all essential details except that the treatment period was 21 days. The results obtained are given in Table 6.

Table 6

| | Basal Ration Without CO-1 | Basal Ration With CO-1 Grams/Ton | | |
|---|---|---|---|---|
| | | 25 | 50 | 100 |
| Body Weight Gain | 369 g | 383 g | 385 g | 386 g |
| Improvement, % | — | 3.8 | 4.3 | 4.4 |
| Feed/gain ratio | 1.76 | 1.74 | 1.72 | 1.72 |
| Improvement, % | — | 1.1 | 2.3 | 2.3 |

EXAMPLE 6

To a reaction vessel there was delivered a solution of 1.15 g of 96% sulfuric acid dissolved in 25 ml acetic acid, 1.23 g (0.01 mole) of 2-amino-4,6-dimethyl pyrimidine and 1.9 g (0.01 mole) of 2-formyl-quinoxaline-di-N-oxide. The mixture was heated at 40° C. for 16 hours then cooled, diluted with water and adjusted to pH 5 with sodium bicarbonate solution. The resulting yellow, crystalline precipitate was filtered and washed to give, in 71% yield, 2.1 g of 2-[2-(2-amino-4-methyl-6-pyrimidinyl)ethenyl] quinoxaline 1,4-dioxide, designated CO-2 for convenience. It melted with decomposition at 240° C.

The feeding experiment of Example 1 is repeated in all essential details except that CO-2 is substituted for CO-1. The chicks receiving CO-2 show significant growth response compared with the control group.

EXAMPLE 7

The experiment of Example 1 is repeated in all essential details except that ducklings are used as the test animals. Those receiving CO-1 show a significant growth response compared with the control group.

EXAMPLE 8

The experiment of Example 1 is repeated in all essential details except that turkey poults are used as the test animals. Those receiving CO-1 show a significant growth response compared with the control group.

EXAMPLE 9

The experiment of Example 1 is repeated in all essential details except that goslings are used as the test animals. Those receiving CO-1 show a significant growth response compared with the control group.

EXAMPLE 10

The experiment of Example 1 is repeated in all essential details except that guinea chicks are used as the test animals. Those receiving CO-1 show a significant growth response compared with the control group.

EXAMPLE 11

The experiment of Example 1 is repeated in all essential details except that pheasant chicks are used as the test animals. Those receiving CO-1 show a significant growth response compared with the control group.

EXAMPLE 12

The experiment of Example 1 is repeated in all essential details except that quail chicks are used as the test animals. Those receiving CO-1 show a significant growth response compared with the control group.

EXAMPLE 13

The experiment of Example 1 is repeated in all essential details except that calves are used as the test animals. Those receiving CO-1 show a significant growth response compared with the control group.

EXAMPLE 14

The experiment of Example 1 is repeated in all essential details except that lambs are used as the test animals. Those receiving CO-1 show a significant growth response compared with the control group.

EXAMPLE 15

The experiment of Example 1 is repeated in all essential details except that kids are used as the test animals. Those receiving CO-1 show a significant growth response compared with the control group.

EXAMPLE 16

The experiment of Example 1 is repeated in all essential details except that baby pigs are used as the test animals. Those receiving CO-1 show a significant growth response compared with the control group.

EXAMPLE 17

The experiment of Example 1 is repeated in all essential details except that the amount of CO-1 employed is 150 g/ton. The chicks receiving CO-1 show significant growth response compared with the control group.

EXAMPLE 18

The experiment of Example 1 is repeated in all essential details except that the amount of CO-1 employed is 10 g/ton. The chicks receiving CO-1 show significant growth response compared with the control group.

EXAMPLE 19

The experiment of Example 1 is repeated in all essential details except that 2-amino-6-ethyl-4-methyl pyrimidine is substituted for 2-amino-4-methyl pyrimidine in equi-molar amounts. There is obtained 2-[2-(2-amino-4-ethyl-6-pyrimidinyl)ethenyl]-quinoxaline-1,4-dioxide, otherwise designated CO-3.

The feeding experiment of Example 1 is repeated in all essential details except that CO-3 is substituted for CO-1 at a concentration of 50 g/ton of feed. The chicks receiving CO-3 show significant growth response compared with the control group.

EXAMPLE 20

The experiment of Example 1 is repeated in all essential details except that 2-amino-6-n-propyl-4-methyl pyrimidine is substituted for 2-amino-4-methyl pyrimidine in equimolar amounts. There is obtained 2-[2-(2-amino-4-n-propyl-6-pyrimidinyl)ethenyl]-quinoxaline-1,4-dioxide, otherwise designated CO-4.

The feeding experiment of Example 1 is repeated in all essential details except that CO-b 4 is substituted for CO-1 at a concentration of 50 g/ton of feed. The chicks receiving CO-4 show significant growth response compared with the control group.

EXAMPLE 21

The experiment of Example 1 is repeated in all essential details except that 2-amino-6-isopropyl-4-methyl pyrimidine is substituted for 2-amino-4-methyl pyrimidine in equi-molar amounts. There is obtained 2-[2-(2-amino-3-isopropyl-5-pyrimidinyl)ethenyl]-quinoxaline-1,4-dioxide, otherwise designated CO-5.

The feeding experiment of Example 1 is repeated in all essential details except that CO-5 is substituted for CO-1 at a concentration of 50 g/ton of feed. The chicks receiving CO-5 show significant growth response compared with the control group.

EXAMPLE 22

The experiment of Example 1 is repeated in all essential details except that 2-amino-6-n-butyl-4-methyl pyrimidine is substituted for 2-amino-4-methyl pyrimidine in equi-molar amounts. There is obtained 2-[2-(2-amino-4-n-butyl-6-pyrimidinyl)ethenyl]-quinoxaline-1,4-dioxide, otherwise designated CO-6.

The feeding experiment of Example 1 is repeated in all essential details except that CO-6 is substituted for CO-1 at a concentration of 50 g/ton of feed. The chicks receiving CO-6 show significant growth response compared with the control group.

EXAMPLE 23

The experiment of Example 1 is repeated in all essential details except that 2-amino-6-isobutyl-4-methyl pyrimidine is substituted for 2-amino-4-methyl pyrimidine in equi-molar amounts. There is obtained 2-[2-(2-amino-4-isobutyl-6-pyrimidinyl)ethenyl]-quinoxaline-1,4-dioxide, otherwise designated CO-7.

The feeding experiment of Example 1 is repeated in all essential details except that CO-7 is substituted for CO-1 at a concentration of 50 g/ton of feed. The chicks receiving CO-7 show significant growth response compared with the control group.

EXAMPLE 24

The experiment of Example 1 is repeated in all essential details except that 2-amino-6-(1-methylpropyl)-4-methyl pyrimidine is substituted for 2-amino-4-methyl pyrimidine in equi-molar amounts. There is obtained 2-[2-(2-amino-4-[1-methylpropyl]-6-pyrimidinyl)-ethenyl]-quinoxaline-1,4-dioxide, otherwise designated CO-8.

The feeding experiment of Example 1 is repeated in all essential details except that CO-8 is substituted for CO-1 at a concentration of 50 g/ton of feed. The chicks receiving CO-8 show significant growth response compared with the control group.

We claim:

1. A method of increasing the growth rate of fowl, ruminants, swine or rabbits comprising orally administering to the animal a compound represented by the formula:

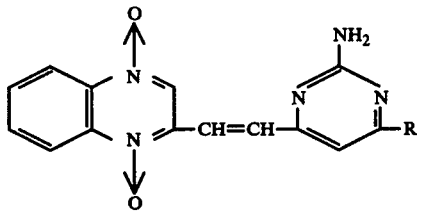

where R is hydrogen or an alkyl group of from 1 to 4 carbon atoms at a dosage of from about 10 to about 150 g per ton of feed rations.

2. The method of claim 1 wherein R is hydrogen.
3. The method of claim 1 wherein R is methyl.
4. The method of claim 1 wherein the level of said compound is about 50 g per ton.
5. The method of claim 1 wherein R is ethyl.
6. The method of claim 1 wherein R is n-propyl.
7. The method of claim 1 wherein R is isopropyl.
8. The method of claim 1 wherein R is n-butyl.
9. The method of claim 1 wherein R is isobutyl.
10. The method of claim 1 wherein R is 1-methylpropyl.
11. The method of claim 1 wherein the level of said compound is from about 25 g to about 100 g/ton.

UNITED STATES PATENT AND TRADEMARK OFFICE
CERTIFICATE OF CORRECTION

PATENT NO. : 4,128,642
DATED : December 5, 1978
INVENTOR(S) : Richard E. Ivy and Robert D. Williams It is certified that error appears in the above-identified patent and that said Letters Patent are hereby corrected as shown below:

Column 3, line 57, Table 1, "22.44%" should read -- 22.04% --

Column 4, line 43, "imrpovement" should read -- improvement --

Column 6, line 61, "CO-b 4" should read -- CO-4 --

Column 7, line 3, "3-isopropyl-5-pyrimidinyl)" should read
-- 4-isopropyl-6-pyrimidinyl) --

Signed and Sealed this

Twenty-sixth Day of June 1979

[SEAL]

Attest:

RUTH C. MASON
Attesting Officer

DONALD W. BANNER
Commissioner of Patents and Trademarks